2,791,612

ISOLATION PROCESS FOR 2-AMINOTHIOPHENOL

Robert Chalk Kinstler, Dunellen, and Robert Henry Ebel, Plainfield, N. J., assignors to American Cyanamid Company, New York, N. Y., a corporation of Maine No Drawing. Application October 10, 1955,
Serial No. 539,661

2 Claims. (Cl. 260—578)

This invention relates to 2-aminothiophenol. More particularly, it relates to the preparation of 2-aminothiophenol. Still more particularly, it relates to an improved process for the isolation of a purified 2-aminothiophenol product.

2-aminothiophenol is important as a dyestuff intermediate, a pharmaceutical intermediate, an intermediate for the preparation of various rubber compounding materials and the like. It is particularly important in the rubber industry in which it is employed in the preparation of an unusually effective class of rubber plasticizers. Because of this and other uses of 2-aminothiophenol, the compound is manufactured in exceptionally large quantities.

2-aminothiophenol is usually prepared commercially by the hydrolysis of benzothiazole with an aqueous caustic soda solution. This reaction may be conducted under pressure at an elevated temperature or it may be conducted at normal pressure under reflux. In either case the reaction mass comprises the sodium salt of 2-aminothiophenol and sodium formate in aqueous solution.

It is then generally the procedure to isolate 2-aminothiophenol by acidification of the reaction mass with a strong mineral acid. It has been observed, however, that 2-aminothiophenol isolated in this manner is of rather low purity and not especially suited for various of its intended uses. Impurities present in the hydrolysis mixture, for instance, are to some extent thrown down and contaminate the product. Moreover, the use of a strong mineral acid liberates formic acid from the by-product sodium formate which in turn tends to react with 2-aminothiophenol to form benzothiazole. Subsequent separation of 2-aminothiophenol from benzothiazole is particularly difficult because their boiling points are very close to each other.

To minimize the formation of these impurities when isolating by using a strong mineral acid, it is necessary to rigidly control the various conditions under which isolation is practiced such as temperature, concentration, speed of agitation and the like. Such tedious attention to these critical factors is particularly difficult in large-scale commercial production. In addition, even when strictly observed the desired purity of product is obtained usually in an unsatisfactory yield.

It is apparent, therefore, that it would be highly desirable to provide a procedure for isolating 2-aminothiophenol from an aqueous salt solution thereof without the difficulties encountered when using a strong mineral acid. Such a procedure should eliminate any substantial formation of impurities without the strict control which must necessarily be practiced when using a strong mineral acid. At the same time, this impurity-free product should be obtained without jeopardizing the yield. This procedure, moreover, should be readily practiced in conventional equipment with a minimum of supervision.

It is an object of this invention to fulfill these various requirements. In accordance with this invention this object has been met in a surprisingly simple yet extremely effective manner. It has been found that a reaction mixture obtained by the hydrolysis of benzothiazole with an aqueous caustic solution may be treated to isolate 2-aminothiophenol of exceptionally high purity by acidifying the solution with acetic acid. Exactly why such superior results are obtained using acetic acid is not at all understood nor is there any desire to limit this invention by any particular theory of operation. That such results may be obtained using acetic acid, however, is particularly surprising in view of the fact that other comparatively weak acids, both inorganic and organic such, for instance, as benzoic acid, carbonic acid, boric acid, and the like fail to produce the same excellent results in the absence of the strict control as required when using a mineral acid.

It is only necessary in the practice of this invention to add sufficient acetic acid to convert substantially the entire sodium salt content to the free 2-aminothiophenol. It is desirable, however, to add sufficient acid to reduce the pH to 7 and preferably to a pH range of from 4 to 7, at which optimum results are obtained. Obviously, acid sufficient to reduce the pH below 4 may be added but no additional advantage is gained. It is desirable to conduct the acidification with agitation to insure complete distribution of the acid content throughout the hydrolysis mixture.

After acidification is complete, the 2-aminothiophenol will have separated in the form of an oil. This oil layer may be readily separated from the aqueous layer in excellent yield. The product obtained is usually of such purity that it need be subjected to no further purification prior to use for its intended purpose.

To further illustrate the invention, the following examples are submitted in which all parts are by weight unless otherwise noted.

Example 1

A mixture of 135 parts of benzothiazole, 82 parts of sodium hydroxide and 225 parts of water is heated for four hours at the reflux temperature. The hydrolysis mixture is then diluted with 350 parts of cold water and 68 parts of glacial acetic acid added with agitation to bring the pH of the mixture to about 6.5. 2-aminothiophenol precipitates as an amber-colored oil. On separation of the oil layer from the aqueous layer, 118.5 parts are obtained representing a yield of 95% of theory. The product analyzed 99.6% pure 2-aminothiophenol on an anhydrous basis.

Example 2

Example 1 was repeated except that the hydrolysis mixture resulting from the reaction of benzothiazole with caustic soda is acidified by the addition of 96% sulfuric acid. A bright yellow oil and some solid material is precipitated. The yield is about 70% of theory and on separation from the solid material the oil is found to analyze 93% 2-aminothiophenol on an anhydrous basis.

Athough the discussion and the examples have been directed to the treatment of the hydrolysis mixture in which the 2-aminothiophenol is in the form of its sodium salt, it is obvious that the isolation procedure of this application is equally as applicable to the other alkali metal salts of 2-aminothiophenol, particularly the potassium salt.

We claim:

1. In the method of preparing 2-aminothiophenol by hydrolyzing benzothiazole with an aqueous solution of an alkali metal hydroxide followed by treatment of the hydrolysis mixture to isolate 2-aminothiophenol, the improvement in combination therewith which comprises isolating 2-aminothiophenol from said hydrolysis mixture by acidifying the latter with acetic acid.

2. A method according to claim 1 in which the acetic acid is added in sufficient amount to adjust the pH of the solution to about 4–7.

References Cited in the file of this patent

UNITED STATES PATENTS

| | | |
|---|---|---|
| 2,007,335 | Lubs et al. | July 9, 1935 |
| 2,441,385 | Bell | May 11, 1948 |

FOREIGN PATENTS

| | | |
|---|---|---|
| 657,183 | France | Jan. 11, 1929 |
| 823,738 | Germany | Dec. 6, 1951 |
| 355,808 | Great Britain | Aug. 31, 1931 |
| 389,511 | Great Britain | Mar. 17, 1933 |